United States Patent
Kashiwagi et al.

(10) Patent No.: US 11,363,003 B2
(45) Date of Patent: Jun. 14, 2022

(54) DATA MANAGEMENT DEVICE, DATA MANAGEMENT SYSTEM, DATA MANAGEMENT METHOD, AND PROGRAM

(71) Applicant: Mitsubishi Electric Corporation, Tokyo (JP)

(72) Inventors: Ryo Kashiwagi, Tokyo (JP); Osamu Nasu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/421,380

(22) PCT Filed: Mar. 11, 2019

(86) PCT No.: PCT/JP2019/009794
§ 371 (c)(1),
(2) Date: Jul. 8, 2021

(87) PCT Pub. No.: WO2020/183584
PCT Pub. Date: Sep. 17, 2020

(65) Prior Publication Data
US 2022/0045993 A1 Feb. 10, 2022

(51) Int. Cl.
*H04L 29/06* (2006.01)
*H04L 9/30* (2006.01)
*H04L 9/40* (2022.01)

(52) U.S. Cl.
CPC ............ *H04L 63/0428* (2013.01); *H04L 9/30* (2013.01)

(58) Field of Classification Search
CPC .............................. H04L 63/0428; H04L 9/30
See application file for complete search history.

(56) References Cited

U.S. PATENT DOCUMENTS

| | | | |
|---|---|---|---|
| 9,635,000 B1* | 4/2017 | Muftic | H04L 9/3239 |
| 11,176,459 B2* | 11/2021 | Frayman | G06N 5/003 |
| 2002/0159481 A1 | 10/2002 | Takatori et al. | |
| 2013/0333009 A1* | 12/2013 | Mackler | H04L 63/08 726/7 |

(Continued)

FOREIGN PATENT DOCUMENTS

| | | |
|---|---|---|
| EP | 0877509 A2 | 11/1998 |
| JP | 5-316099 A | 11/1993 |

(Continued)

OTHER PUBLICATIONS

International Search Report and Written Opinion dated Jun. 4, 2019, received for PCT Application PCT/JP2019/009794, Filed on Mar. 11, 2019, 11 pages including English Translation.

(Continued)

*Primary Examiner* — Yonas A Bayou
(74) *Attorney, Agent, or Firm* — Xsensus LLP

(57) ABSTRACT

A data management device (10) includes an insertion position determiner (121) to determine an insertion position of dummy data to be inserted into transmission target data, a dummy data inserter (122) to insert the dummy data in the insertion position of the transmission target data to create dummy-inserted data, an insertion position encryptor (123) to encrypt data indicating the insertion position with a public key (PUBa) to create insertion-position-encrypted data; and a deliverer (110) to deliver the dummy-inserted data and the insertion-position-encrypted data.

10 Claims, 17 Drawing Sheets

(56) References Cited

U.S. PATENT DOCUMENTS

| | | | |
|---|---|---|---|
| 2014/0281512 A1 | 9/2014 | Arasu et al. | |
| 2016/0173288 A1* | 6/2016 | Li | H04L 63/0428 713/168 |
| 2016/0330027 A1* | 11/2016 | Ebrahimi | H04L 9/3239 |
| 2016/0342989 A1* | 11/2016 | Davis | G06Q 20/385 |
| 2017/0132620 A1* | 5/2017 | Miller | H04W 12/04 |
| 2017/0132625 A1* | 5/2017 | Kennedy | G06F 16/2379 |
| 2017/0132630 A1* | 5/2017 | Castinado | G06Q 20/385 |
| 2017/0308580 A1 | 10/2017 | Naganuma et al. | |

FOREIGN PATENT DOCUMENTS

| | | | |
|---|---|---|---|
| JP | 10-49048 A | | 2/1998 |
| JP | 10-327141 A | | 12/1998 |
| JP | 2001-318875 A | | 11/2001 |
| JP | 2002-23624 A | | 1/2002 |
| JP | 2002-33728 A | | 1/2002 |
| JP | 2002023624 A | * | 1/2002 |
| JP | 2002-40939 A | | 2/2002 |
| JP | 2002-111660 A | | 4/2002 |
| JP | 2006-185096 A | | 7/2006 |
| JP | 2008-287550 A | | 11/2008 |
| JP | 2011-259439 A | | 12/2011 |
| WO | 2013/044305 A1 | | 4/2013 |
| WO | 2016/120975 A1 | | 8/2016 |

OTHER PUBLICATIONS

Notice of Reasons for Refusal dated Aug. 4, 2020, received for JP Application 2020-519156, 8 pages including English Translation.

Kato, "Basic Cryptography I", Saiensu-Sha Co., Ltd., Orientation Distribution Cryptography, Sep. 25, 1989, pp. 258-264 (19 pages including English Translation).

Hayashi, "Secure Computation using Homomorphic Encryption and its Applications, System/Control/Information", Feb. 5, 2019, vol. 63, No. 2, pp. 64-70.

Decision to Grant dated Dec. 8, 2020, received for JP Application 2020-519156, 5 pages including English Translation.

* cited by examiner

| TIME OF DAY | VOLTAGE [V] | CURRENT [mA] | NUMBER OF REVOLUTIONS [RPM] |
|---|---|---|---|
| 13:02:03 | 24.0 | 130.5 | 502 |
| 13:02:05 | 24.1 | 131.7 | 505 |
| 13:02:09 | ... | ... | ... |
| 13:02:12 | ... | ... | ... |
| ... | ... | ... | ... |
| ... | ... | ... | ... |

OLDER ↓ NEWER

FIG. 6

| TIME OF DAY | VOLTAGE [V] | CURRENT [mA] | NUMBER OF REVOLUTIONS [RPM] |
|---|---|---|---|
| 13:02:03 | 24.0 | //////// | 130.5 |
| 13:02:05 | 24.1 | 131.7 | 505 |
| 13:02:09 | ... | ... | //////// |
| 13:02:12 | ... | //////// | ... |
| ... | ... | ... | ... |
| ... | ... | ... | ... |

| TIME OF DAY | VOLTAGE [V] | CURRENT [mA] | NUMBER OF REVOLUTIONS [RPM] |
|---|---|---|---|
| 13:02:03 | 24.0 | 130.5 | 502 |
| | | | |
| 13:02:05 | 24.1 | 131.7 | 505 |
| 13:02:09 | ... | ... | ... |
| | | | |
| 13:02:12 | ... | ... | ... |
| | | | |
| | | | |
| ... | ... | ... | ... |
| ... | ... | ... | ... |
| | | | |

| TIME OF DAY | VOLTAGE [V] | CURRENT [mA] | RESISTANCE [Ω] (DUMMY) | NUMBER OF REVOLUTIONS [RPM] | TEMPERATURE [°C] (DUMMY) |
|---|---|---|---|---|---|
| 13:02:03 | 24.0 | 130.5 | | 502 | |
| 13:02:05 | 24.1 | 131.7 | | 505 | |
| 13:02:09 | ... | ... | | ... | |
| 13:02:12 | ... | ... | | ... | |
| ... | ... | ... | | ... | |
| ... | ... | ... | | ... | |

| TIME OF DAY | VOLTAGE [V] | CURRENT [mA] | RESISTANCE [Ω] (DUMMY) | NUMBER OF REVOLUTIONS [RPM] | TEMPERATURE [°C] (DUMMY) |
|---|---|---|---|---|---|
| 13:02:03 | 24.0 | 130.5 | | 502 | |
| | | | | | |
| 13:02:05 | 24.1 | 131.7 | | 505 | |
| 13:02:09 | ... | ... | | ... | |
| | | | | | |
| 13:02:12 | ... | ... | | ... | |
| | | | | | |
| ... | ... | ... | | ... | |
| | | | | | |
| | | | | | |
| ... | ... | ... | | ... | |
| | | | | | |

⋮

DATA MANAGEMENT DEVICE, DATA MANAGEMENT SYSTEM, DATA MANAGEMENT METHOD, AND PROGRAM

CROSS-REFERENCE TO RELATED APPLICATION

The present application is based on PCT filing PCT/JP2019/009794, filed Mar. 11, 2019, the entire contents of which are incorporated herein by reference.

TECHNICAL FIELD

The present disclosure relates to a data management device, a data management system, a data management method, and a program.

BACKGROUND ART

A technique of inserting dummy data into transmission target data to keep the data secure in data transmission and reception is known. Sharing of an insertion position of the dummy data by a sender and a recipient using some means and sending of the data with the inserted dummy data from the sender to the recipient can keep the transmission target data secure from a third party who is not the recipient. The recipient knowing the insertion position can recover the transmission target data from the data with the inserted dummy data, but the third party has difficulty in recovering the transmission target data from the data with the inserted dummy data.

The aforementioned technique is applicable to either of data communication between devices or data communication between functional unites within a device. For example, in a case where a communication path between the devices can be listened in on by the third party, the transmission target data can be kept secure from the third party by applying the above technique to the data communication between the devices. In another case, for example, where such a device is a device on which a program made by the third party is executable, the communication path between the functional units can conceivably be listened in on by the third party by executing a malicious program. In such a case, the transmission target data can be kept secure from the third party by applying the above technique to the data communication between the functional units.

Patent Literature 1 discloses a communication system that keeps the transmission target data secure by inserting dummy data into the transmission target data and then uses common key-based encryption of the data with the inserted dummy data. In the communication system of Patent Literature 1, the insertion position of the dummy data and the common key used for encryption are determined based on common data generated by a common data generator having a function common to a sender's first communication device and a recipient's second communication device. Since identical common data is generated for the first communication device and the second communication device by the common data generator, the insertion position and the common key can be shared by the first communication device and the second communication device, that is, the sender and the recipient.

CITATION LIST

Patent Literature

Patent Literature 1: Unexamined Japanese Patent Application Publication No. 2011-259439

SUMMARY OF INVENTION

Technical Problem

However, the communication system of Patent Literature 1 suffers from loss of confidentiality of data upon the function of the common data generator being known to the third party. For example, the third party can know the function of the common data generator by obtaining and analyzing a product corresponding to the first communication device or the second communication device described above. The third party having knowledge of the function of the common data generator can easily know the common data for use between the first communication device and the second communication device. Then the third party having knowledge of the common data can know the insertion position and the common key that are determined based on the common data. Thus the third party can easily recover the transmission target data from the data with the inserted dummy data.

In view of the above circumstances, an objective of the present disclosure is to provide a data management device and the like that cause difficulty for the third party to recover the transmission target data from the data with the inserted dummy data.

Solution to Problem

To achieve the above objective, a data management device according to the present disclosure includes insertion position determination means for determining an insertion position of dummy data to be inserted into transmission target data, dummy data insertion means for inserting the dummy data in the insertion position of the transmission target data to create dummy-inserted data, insertion position encryption means for encrypting data indicating the insertion position with a public key to create insertion-position-encrypted data, and transmission means for transmitting the dummy-inserted data and the insertion-position-encrypted data.

Advantageous Effects of Invention

According to the present disclosure, since an insertion position of dummy data is encrypted with a public key, a third party having a secret key corresponding to the public key has difficulty in recovering transmission target data.

BRIEF DESCRIPTION OF DRAWINGS

FIG. 6 is a diagram illustrating an example of dummy data insertion by the data management device according to Embodiment 1 of the present disclosure;

FIG. 7 is a diagram illustrating an example of the dummy data insertion by the data management device according to Embodiment 1 of the present disclosure;

FIG. 8 is a diagram illustrating an example of the dummy data insertion by the data management device according to Embodiment 1 of the present disclosure;

FIG. 9 is a diagram illustrating an example of the dummy data insertion by the data management device according to Embodiment 1 of the present disclosure;

DESCRIPTION OF EMBODIMENTS

Embodiments in which a data management device according to the present disclosure is applied to a data management system is described with reference to the drawings. The same reference signs are given the same or equivalent part throughout the drawings.

Embodiment 1

Figure 1:
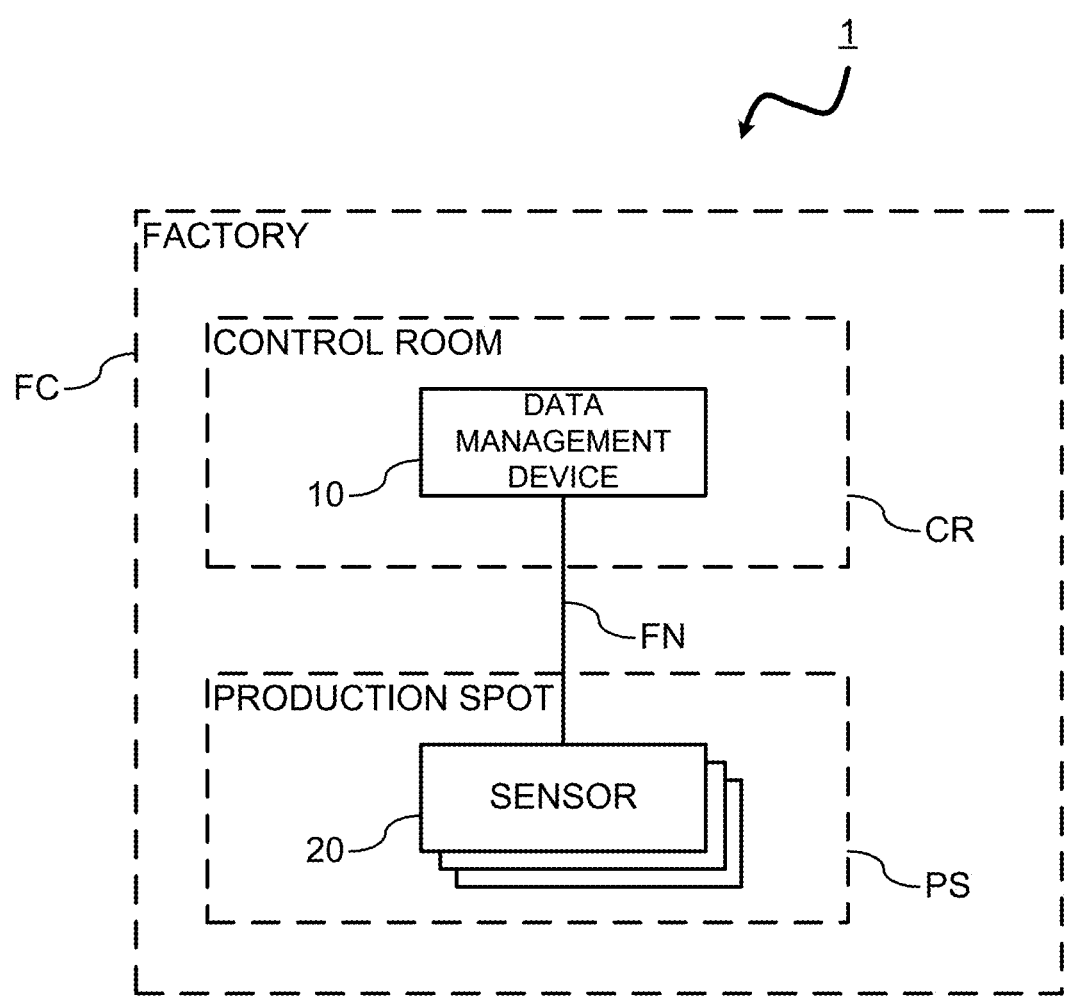
FIG. 1 is a configuration diagram of a data management system according to Embodiment 1 of the present disclosure.

A data management system 1 according to Embodiment 1 is described with reference to FIG. 1. The data management system 1 is a system that collects sensed data from a plurality of sensors 20 that are present at a production spot PS of a factory FC and processes the collected data. The data management system 1 includes a data management device 10 that collects the sensed data from the sensors 20 and processes the collected data, and the sensors 20 that sense conditions, environments, and the like and send the sensed data to the management device 10.

The data management device 10 is, for example, an industrial computer installed in a control room CR of the factory FC. The data management device 10 communicates with each sensor 20 via a factory network FN and receives the sensed data from each sensor 20. The data management device 10 processes the sensed data received from each sensor 20. A functional configuration of the data management device 10 is described later. The data management device 10 is an example of a data management device according to the present disclosure.

In processing the sensed data in the data management device 10, the transmission target data is created based on the sensed data, the transmission target data is kept secure and transmitted to a data processor 30, and the secure transmission target data is recovered and processed by the data processor 30. Details of such security are described later. In Embodiment 1, for ease of understanding, data is not assumed to be made secure in communication other than data transmission to the data processor 30.

The "transmission target data" can be considered as being termed the "reception target data" in a case where the data processor 30 receiving the data is regarded as a subject. However, in the following description, such data is collectively referred to as "transmission target data".

The sensor 20 is, for example, a sensor disposed in industrial equipment installed at a production spot PS of a factory FC. Examples of the sensor 20 include, for example, a voltage sensor, a current sensor, and a rotational speed sensor that are disposed in the industrial equipment. The sensor 20 continuously senses conditions of the industrial equipment, such as voltage, current, number of revolutions, and continuously transmits the sensed data through a factory network FN to the data management device 10. In the following description, each sensor 20 is provided in the industrial equipment and, and transmits to the data management device 10 voltage data, current data, and number of revolutions data as sensed data.

Next, an example of the transmission target data created by the data management device 10 is described with reference to FIG. 2. The transmission target data here refers to raw data that has yet to be made secure.

Figure 2:
FIG. 2 is a diagram illustrating an example of transmission target data in the data management system according to Embodiment 1 of the present disclosure.

As illustrated in FIG. 2, the transmission target data includes time series data expressed in columns and rows. In the example illustrated in FIG. 2, the sensed data that are data of voltage, current, and number of revolutions are associated with a time of a day in each row. That is, the transmission target data is time series data expressed in rows and columns and associated row-by-row with a time. Since the association with the sensed data is not limited to being with a time of day but may be with any parameter that is related to time, such as data and time including a day, a month, and a year, elapsed time from a predetermined time of day, a period from a certain time of day to another certain time of day, or the like, the expression "time" is used here instead of "time of day".

In consideration of insertion of dummy data described later, the number of rows of time series data is preferably a somewhat random number. With a fixed number of rows of times series data, the number of units of inserted dummy data may be guessed, which can lead to easy guessing of the time series data itself. In the following description, the number of rows of the time series data is assumed to be a somewhat random number.

In addition to the aforementioned time series data, the transmission target data may include metadata indicating a date of time of data creation, information relating to the data management device 10, information relating to processing to be performed by the data processor 30 described later, and the like.

Next, the functional configuration of the data management device 10 is described with reference to FIG. 3. The data management device 10 includes a collector 100 that collects sensed data from each sensor 20, a deliverer 110 that centrally controls data delivery, a converter 120 that converts transmission target data to secure data, the data processor 30 that receives the secure data and recovers the transmission target data, and process the transmission target data, a storage 130 that stores a public key PUBa of the data processor 30, and a display 140 that displays a processing result of the data processor 30.

Figure 3:
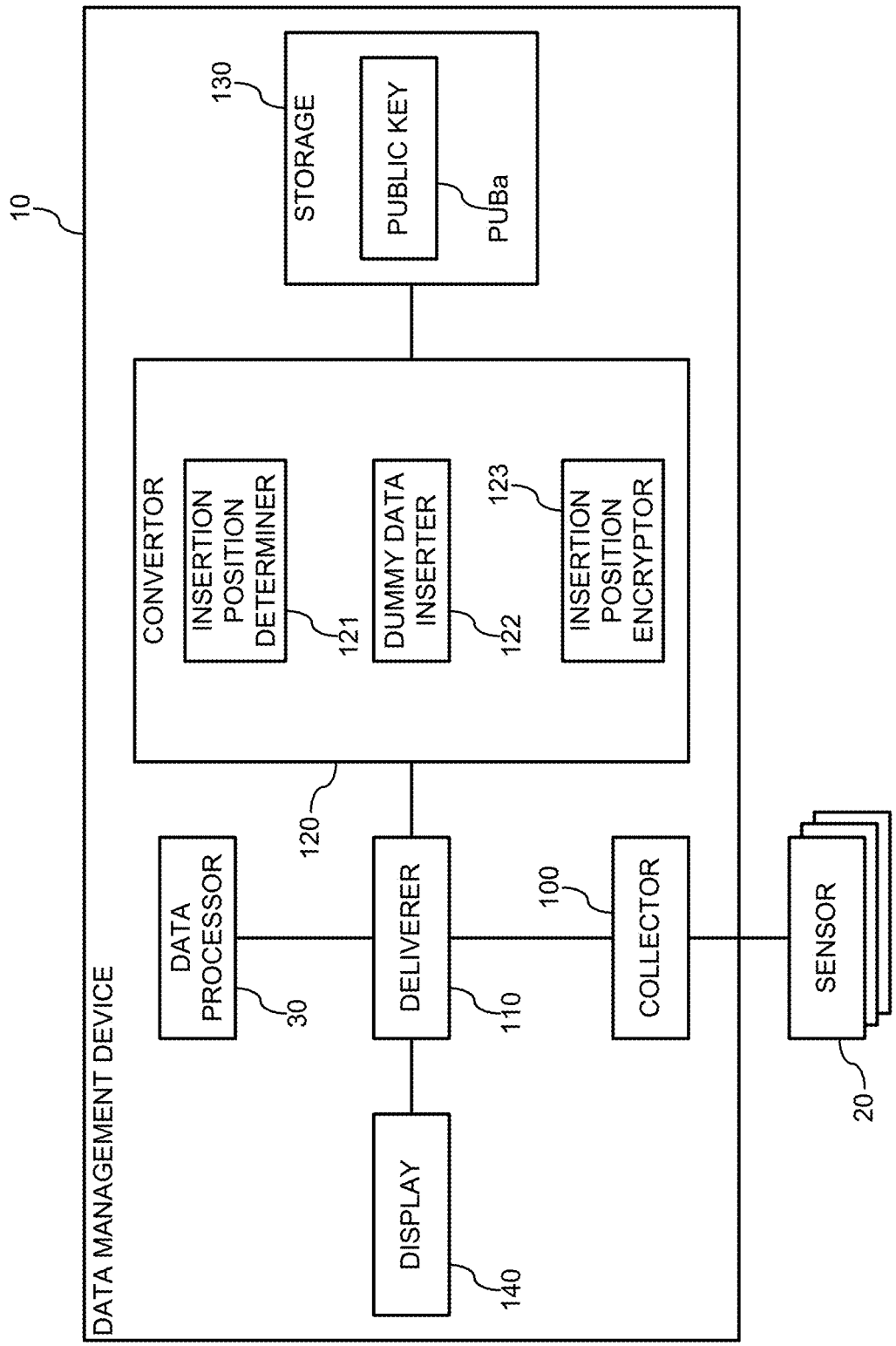
FIG. 3 is a functional configuration diagram of the data management device according to Embodiment 1 of the present disclosure.

Although FIG. 3 illustrates a single data processor 30 and a single collector 100, there may be a plurality of data processors 30 and a plurality of collectors 100. The data processor 30 and the collector 100 may be assumed to be created by a creator who is not a manufacturer of the data management device 10, which is different from another functional unit of the data management device 10. For example, a function of the data processor 30 or the collector 100 created by the creator is implemented by using the data management device 10 executing the program created by the creator. In the following description, the data processor 30 is assumed to be created by a creator that is not a manufacturer of the data management device 10.

For ease of understanding, an overview of the data processor 30 is described before describing details of each component of the data management device 10. The public key PUBa is also described. The data processor 30 receives secure data from the deliverer 110. The data processor 30 recovers the transmission target data from the secure data. The data processor 30 processes the transmission target data. Examples of data processing include diagnosing, based on data such as a voltage, a current, a number of revolutions, and the like included in the transmission target data, whether abnormality occurs in industrial equipment installed in a production spot PS of a factory FC. In the following description, the data processor 30 is assumed to diagnose, as data processing, the industrial equipment based on data of the voltage, the current, and the number of revolutions included in the transmission target data. The data processor 30 transmits processing result data to the deliverer 110. The data processor 30 is an example of data processing means according to the present disclosure.

A creator of the data processor 30, for example, creates beforehand a public key and a secret key corresponding to the public key, distributes as a public key PUBa the public key to a manufacturer of the data management device 10, and saves as a secret key SECa described later the secret key into the data processor 30. The public key and the secret key are created, for example, by RSA algorithm.

Details of each functional unit of the data management device 10 are described below. The collector 100 continuously receives sensed data from each sensor 20 and outputs to the deliverer 110 the data associated with a collection time of day. The collector 100 is implemented, for example, by a network interface for a factory network.

The deliverer 110 continuously obtains from the collector 100 the sensed data associated with the collection time of day. Upon obtaining at least the predetermined number of sensed data, the deliverer 110 compiles the sensed data and creates the transmission target data as illustrated in FIG. 2. The deliverer 110 outputs the transmission target data to the converter 120, and obtains the secure data from the converter 120. The deliverer 110 transmits the secure data to the data processor 30. The deliverer 110 receives processing result data from the data processor 30. The deliverer 110 outputs the processing result data to the display 140 and causes the display 140 to display a processing result. The deliverer 110 is an example of transmission means according to the present disclosure.

The converter 120 obtains the transmission target data from the deliverer 110 and converts the data into secure data, and outputs the secure data to the deliverer 110. More specifically, the converter 120 converts the transmission target data into secure data by inserting dummy data into the transmission target data to create dummy-inserted data, encrypting data indicating an insertion position with a public key PUBa of the data processor 30 to create insertion-position-encrypted data, and combining the dummy-inserted data and the insertion-position-encrypted data. That is, the converter 120 makes the transmission target data secure by inserting the dummy data into the transmission target data and encrypting the data indicating the insertion position.

The converter 120 includes an insertion position determiner 121 that determines an insertion position of the dummy data, a dummy data inserter 122 that inserts the dummy data into the transmission target data to create inserted data, and an insertion position encryptor 123 that encrypts the data indicating the insertion position to create insertion-position-encrypted data.

The insertion position determiner 121 determines the insertion position of the dummy data to be inserted into the transmission target data. Details of determination of the insertion position are described later. To make guessing of the insertion position by a third party difficult, the insertion position determiner 121 preferably determines the insertion position every predetermined number of transmissions. In particular, changing the insertion position every transmission is preferable. For example, the insertion position determiner 121 randomly determines the insertion position every transmission. However, matching of the insertion positions resulting from random determination of the insertion position may occur by coincidence. Alternatively, the insertion position may be determined, not every transmission, but every predetermined second or more number of transmissions, such as every third transmission, fifth transmission, or the like. The "predetermined number of transmissions" may not necessarily be a constant. For example, in a case where the current "predetermined number of transmissions" is 3 and the insertion position is determined after three transmissions, a new "predetermined number of transmissions" may be another number. The insertion position determiner 121 is an example of insertion position determination means according to the present disclosure.

The dummy data inserter 122 inserts the dummy data in the insertion position determined by the insertion position determiner 121 to create dummy-inserted data. Details of the dummy data is described later. The dummy data inserter 122 is an example of dummy data insertion means according to the present disclosure.

The insertion position encryptor 123 creates data indicating the insertion position determined by the insertion position determiner 121. The insertion position encryptor 123 encrypts the data indicating the insertion position with a public key PUBa of the data processor 30 stored in the storage 130 and creates insertion-position-encrypted data. The insertion position encryptor 123 is an example of insertion position encryption means according to the present disclosure.

The converter 120 combines the dummy-inserted data created by the dummy data inserter 122 and the insertion-position-encrypted data created by the insertion position encryptor 123 to create secure data, and outputs the secure data to the deliverer 110.

The storage 130 stores the public key PUBa of the data processor 30. As described above, the public key PUBa is, for example, distributed beforehand by the creator of the data processor 30.

The display 140 obtains the processing result data from the deliverer 110 and displays the processing result based on the data. As described above, in the present disclosure, the data processor 30 performs a diagnosis, and thus the display 140 displays a result of the diagnosis. The display 140 is implemented, for example, by using a liquid crystal display, a display of an electric billboard, or the like.

Figure 4:
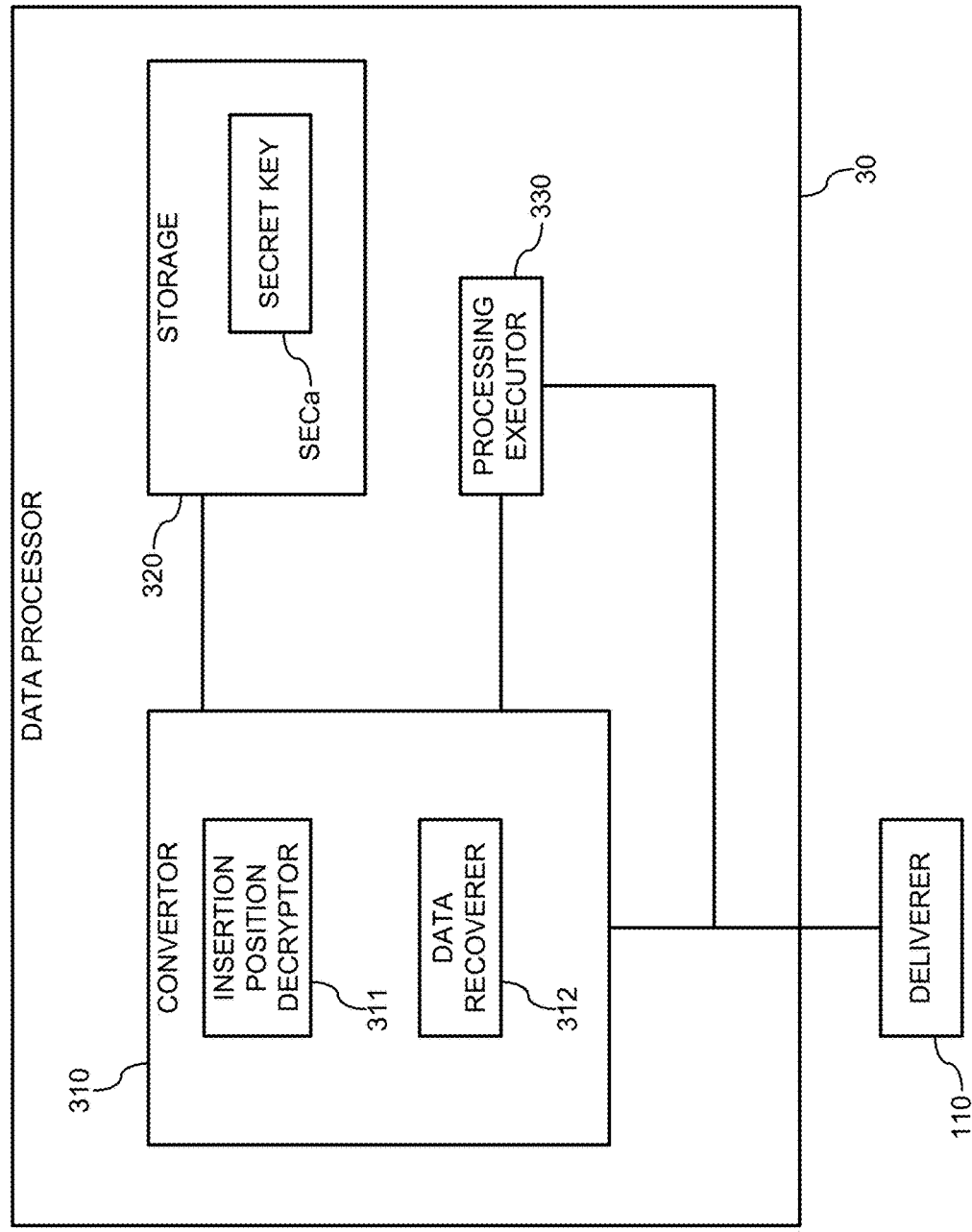
FIG. 4 is a functional configuration diagram of a data processor of the data management device according to Embodiment 1 of the present disclosure.

The functional configuration of the data processor 30 is described with reference to FIG. 4. The data processor 30 includes a converter 310 that receives the secure data from the deliverer 110, a storage 320 that stores a secret key SECa, and a processing executor 330 that processes the transmission target data. As described above, the secret key SECa is a secret key corresponding to the public key PUBa. The data encrypted with the public key PUBa can be decrypted with the secret key SECa.

The converter 310 receives the secure data from the deliverer 110 and converts the data into the transmission target data, and outputs the transmission target data to the processing executor 330. More specifically, the converter 310 converts the secure data into the transmission target data by decrypting, with the secret key SECa, the insertion-position-encrypted data included in the secure data to obtain data indicating the insertion position and then deleting the dummy data inserted in the insertion position from the dummy-inserted data included in the secure data to recover the transmission target data. The converter 310 is an example of reception means according to the present disclosure.

The converter 310 includes an insertion position decryptor 311 that decrypts the data indicating the insertion position from the insertion-position-encrypted data, and a data recoverer 312 that deletes the dummy data from the dummy-inserted data to recover the transmission target data.

The insertion position decryptor 311 decrypts the insertion-position-encrypted data included in the secure data with the secret key SECa stored in the storage 320 to obtain the data indicating the insertion position. As described above, the insertion-position-encrypted data is data obtained by encrypting the data indicating the insertion position with the public key PUBa of the data processor 30. Thus the insertion-position-encrypted data can be decrypted with the secret key SECa corresponding to the public key PUBa. The insertion position decryptor 311 is an example of insertion position decryption means according to the present disclosure.

The data recoverer 312 recovers the transmission target data by referring to the data indicating insertion position obtained by decrypting by the insertion position decryptor 311 and removing the dummy data inserted in the insertion position from the dummy-inserted data. The data recoverer 312 is an example of data recovery means according to the present disclosure.

The converter 310 outputs the transmission target data recovered by the data recoverer 312 to the processing executor 330.

The storage 320 stores the secret key SECa corresponding to the public key PUBa. The secret key SECa and the public key PUBa are as described above.

The processing executor 330 obtains the transmission target data from the converter 310 and processes the data. As described above, the data processor 30 performs a diagnosis as processing, and thus the processing executor 330 performs a diagnosis based on the transmission target data. The processing executor 330 diagnoses whether or not abnormality occurs in industrial equipment installed in the factory FC, for example, based on changes in a voltage, a current, and a number of revolutions for the last 5 minutes indicated by the transmission target data. The processing executor 330 transmits the processing result data to the deliverer 110.

As described above, the data processor 30 performs a diagnosis as processing, and thus the processing result is a result of diagnosis. The result of diagnosis may be, for example, an indication of whether abnormality exists or an indication of, in addition to the result of whether or not abnormality exists, information that can be a basis of the diagnosis, such as information about a change in voltage, information about comparison between the sensed data and a threshold, or the like.

Figure 5:
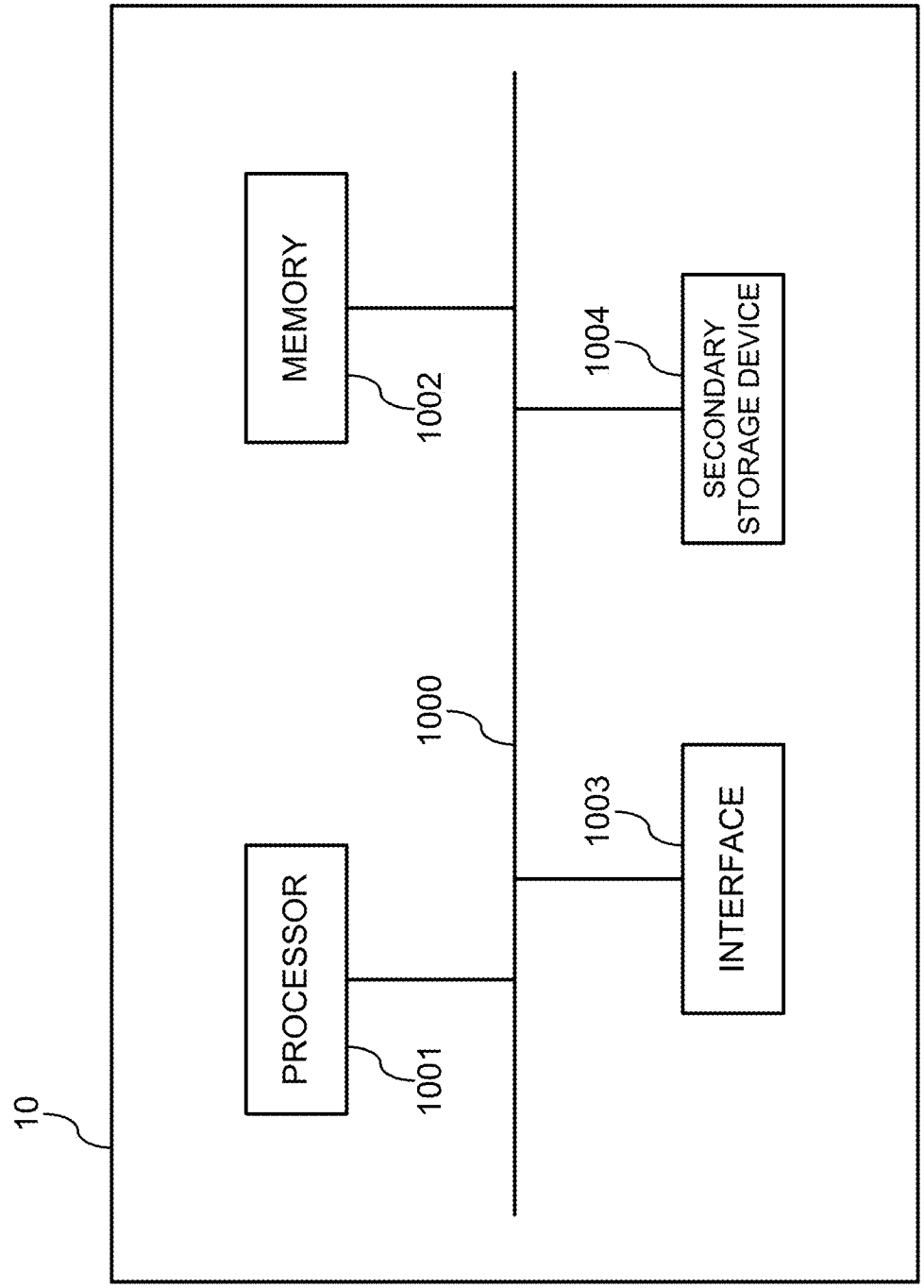
FIG. 5 is a diagram illustrating an example of a hardware configuration of the data management device according to Embodiment 1 of the present disclosure.

Next, an example of a hardware configuration of the data management device 10 is described with reference to FIG. 5. The data management device 10 illustrated in FIG. 5 is implemented, for example, by using a computer such as a personal computer or a microcontroller.

The data management device 10 includes a processor 1001, a memory 1002, an interface 1003, and a secondary storage 1004, which are mutually interconnected via a bus 1000.

The processor 1001 is, for example, a central processing unit (CPU). Each function of the data management device 10 is implemented by using processor 1001 reading an operation program stored in the secondary storage 1004 into a memory 1002 and executing the operation program.

The memory 1002 is, for example, a main storage including a random access memory (RAM). The memory 1002 stores the operation program read by the processor 1001 from the secondary storage 1004. The memory 1002 functions as working memory in execution of the operation program by the processor 1001.

The interface 1003 is an input/output (I/O) interface, such as a serial port, a universal serial bus (USB) port, a network interface. The function of the collector 100 is implemented by using the interface 1003.

The secondary storage 1004 is, for example, a flash memory, a hard disk drive (HDD), and a solid state drive (SSD). The secondary storage 1004 stores an operation program executed by the processor 1001. The functions of the storage 130 and the storage 320 are implemented by using the secondary storage 1004.

Next, determination of the insertion position and insertion of dummy data are described with reference to FIGS. 2, 6, 7, 8, and 9. As examples of a method for determining the insertion position of dummy data into time series data expressed in rows and columns included in the transmission target data as illustrated in FIG. 2, the following four methods are considered, in which data indicated by diagonally shaded area in FIGS. 6, 7, 8, and 9 is dummy data:

(a) randomly determining the insertion position of dummy data, as illustrated in FIG. 6, (b) determining the insertion position of dummy data such that the number of rows increases, as illustrated in FIG. 7, (c) determining the insertion position of dummy data such that the number of columns increase, as illustrated in FIG. 8, and (d) combining (b) with (c), as illustrated in FIG. 9

In the case of the method (a) that randomly determines the insertion position, the number of columns of data vary with the time of day as illustrated in FIG. 6. Thus, as described below, there is a problem in that the third party can easily guess which data is the dummy data. In light of the above, the methods (b), (c), and (d) are preferable to the method (a).

For example, when attention is directed to a row with the minimum number of columns among data illustrated in FIG. 6, dummy data is understood to not be inserted in the row. Thus it is contemplated that even a third party without knowledge of the insertion position of the dummy data would think that no dummy data is inserted in the row with the minimum number of columns and guess the number of dummy data units inserted in the rows without the minimum number of columns.

In addition, since the type of sensed data is determined for each column, the third party could conceivably guess which data is the dummy data. In an example, attention is given to the top two rows illustrated in FIG. 6, that is, a row of the time 13:02:03 (hereinafter referred to as the first row) and a row of the time 13:02:05 (hereinafter referred to as the second row). Since the second row has the minimum number of columns that is 3, the third party would guess that dummy data is not inserted in the second row. Since the first row has 5 columns, the third party would guess that 2 pieces of dummy data are inserted. Since the data 131.7 of "current" in the second row approximates the data 130.5 of "number of revolutions" in the first row, the third party would guess that "number of revolutions" in the first row is data that should have been "current" and the data of "current" in the first row would be dummy data. Similarly, the third party would guess that the data at the end of the first row is dummy data.

As described above, in a case where dummy data is inserted into time series data expressed in rows and columns, which data is dummy data might be guessed if the insertion position is randomly determined.

In the method (b) that determines the insertion position so that the number of rows increases, a dummy row, which has dummy data in the whole row, is added between a row of a time of day and another row of a time of day as illustrated in FIG. 7. As described above, since the number of rows of time series data without a dummy row inserted is random to some extent, guessing the number of dummy rows can be hard even after insertion of the dummy rows. The data format of the dummy row is the same as that of the non-dummy row, and thus the dummy data would not be guessed based on a difference of column data as in the case of the method (a). Thus which row is the dummy row is difficult to guess. The number of dummy rows to be inserted and the insertion position of the dummy row are preferably determined randomly every predetermined number of transmissions.

In a system for processing data of a production spot at a factory, such as the data management system 1, temporal change in data to be processed is important. Thus inserting the dummy row with the method (b) and camouflaging the temporal change in data prevent the third party from utilizing the data even if the data including the dummy row is obtained as is. Thus the transmission target data can be made secure by inserting the dummy row into the time series data included in the transmission target data.

In the method (c) that determines the insertion position such that the number of columns increase, a dummy column, which has dummy data in the whole column, is added between a certain column and another column as illustrated in FIG. 8. For example, as illustrated in FIG. 8, a column of "resistance" and a column of "temperature" are added as dummy rows, and a value that is difficult to be guessed as dummy data by the third party is set as dummy data in each row of the columns. Inserting the dummy column in this way makes utilization of the data with the inserted dummy column by the third party difficult without the third party knowing about the column to be actually used in processing of data. The number of dummy columns to be inserted and the insertion position of the dummy column are preferable fixed, oppositely to the case of the dummy row. This is because if the insertion position of the dummy column changes every transmission, guessing a non-dummy column can be easier to the third party. For example, based on data with a column of "resistance" and a column of "temperature" inserted and data with only a column of "resistance" inserted, the third party would guess that the column of "temperature" is the dummy column. If the insertion position of the column of "resistance" changes, the third party would guess that the column of "resistance" is the dummy data.

As illustrated in FIG. 9, a combination of the methods (b) and (c) can further improve confidentiality of the transmission target data.

As described above, since the transmission target data may include metadata, dummy data may also be inserted in the metadata. The metadata is not time series data expressed in rows and columns, and thus in a case where the dummy data is inserted in the metadata, the insertion position of the dummy data is randomly determined.

Figure 10:
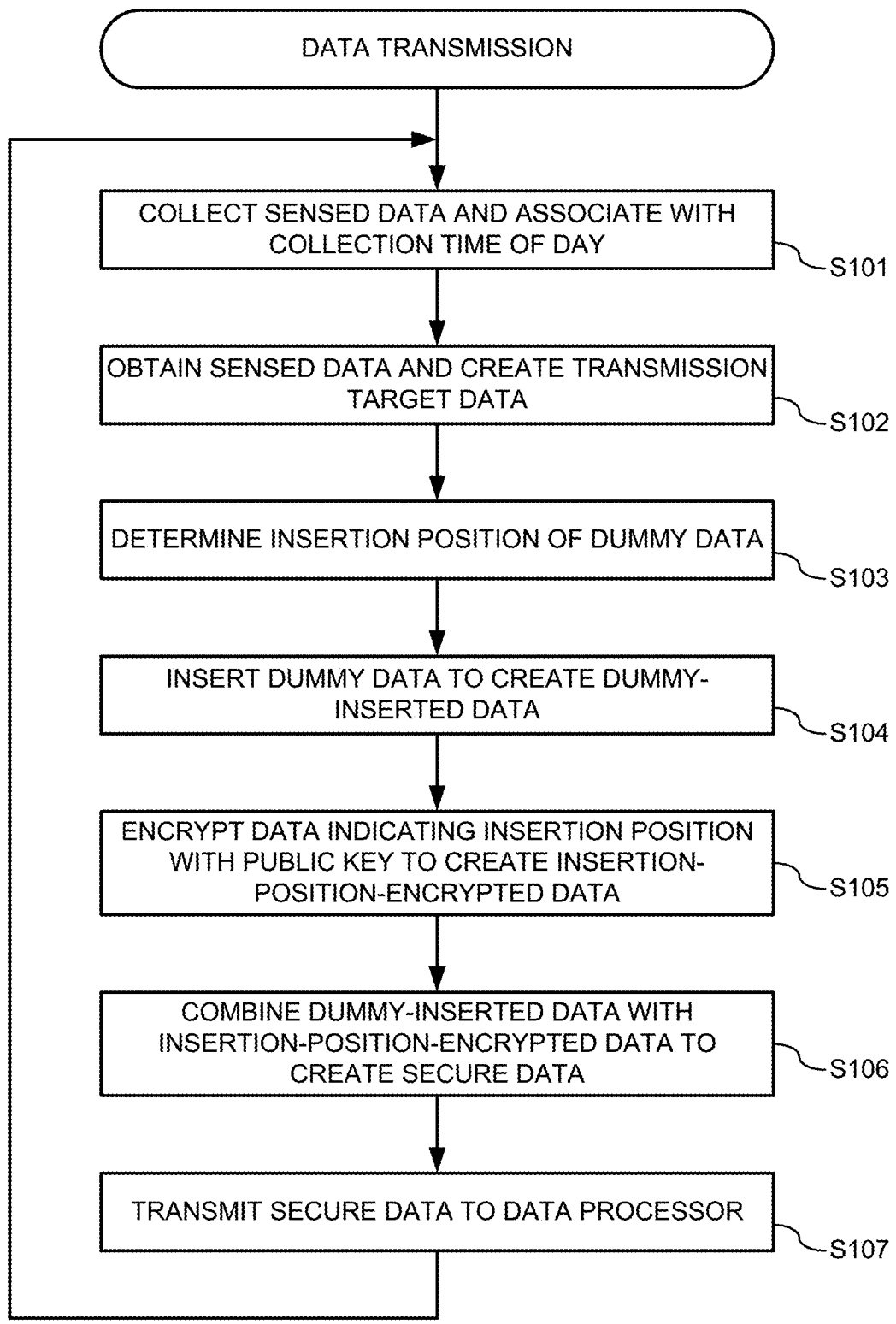
FIG. 10 is a flowchart illustrating an example of an operation of data transmission by the data management device according to Embodiment 1 of the present disclosure.

Next, an example of an operation of data transmission by the data management device 10 to the data processor 30 is described with reference to FIG. 10. The operation indicated in FIG. 10 starts, for example, at time of activation of the data management device 10.

The collector 100 of the data management device 10 collects sensed data from each sensor 20 and associates the sensed data with a collection time of day (step S101). The deliverer 110 of the data management device 10 obtains the sensed data from the collector 100 to create transmission target data (step S102).

The insertion position determiner 121 of the converter 120 of the data management device 10 determines the insertion position of dummy data to be inserted into the transmission target data (step S103). The dummy data inserter 122 of the converter 120 inserts the dummy data in the insertion position determined in step S103 to create dummy-inserted data (step S104). The insertion position encryptor 123 of the converter 120 encrypts the data indicating the insertion position with the public key PUBa of the data processor 30 stored in the storage 130 to create insertion-position-encrypted data (step S105).

The converter 120 combines the dummy-inserted data created in step S104 with the insertion-position-encrypted data created in step S105 to create secure data (step S106). The deliverer 110 transmits the secure data created in step S106 to the data processor 30 (step S107). Then the data management device 10 repeats a flow of operation steps from step S101.

Figure 11:
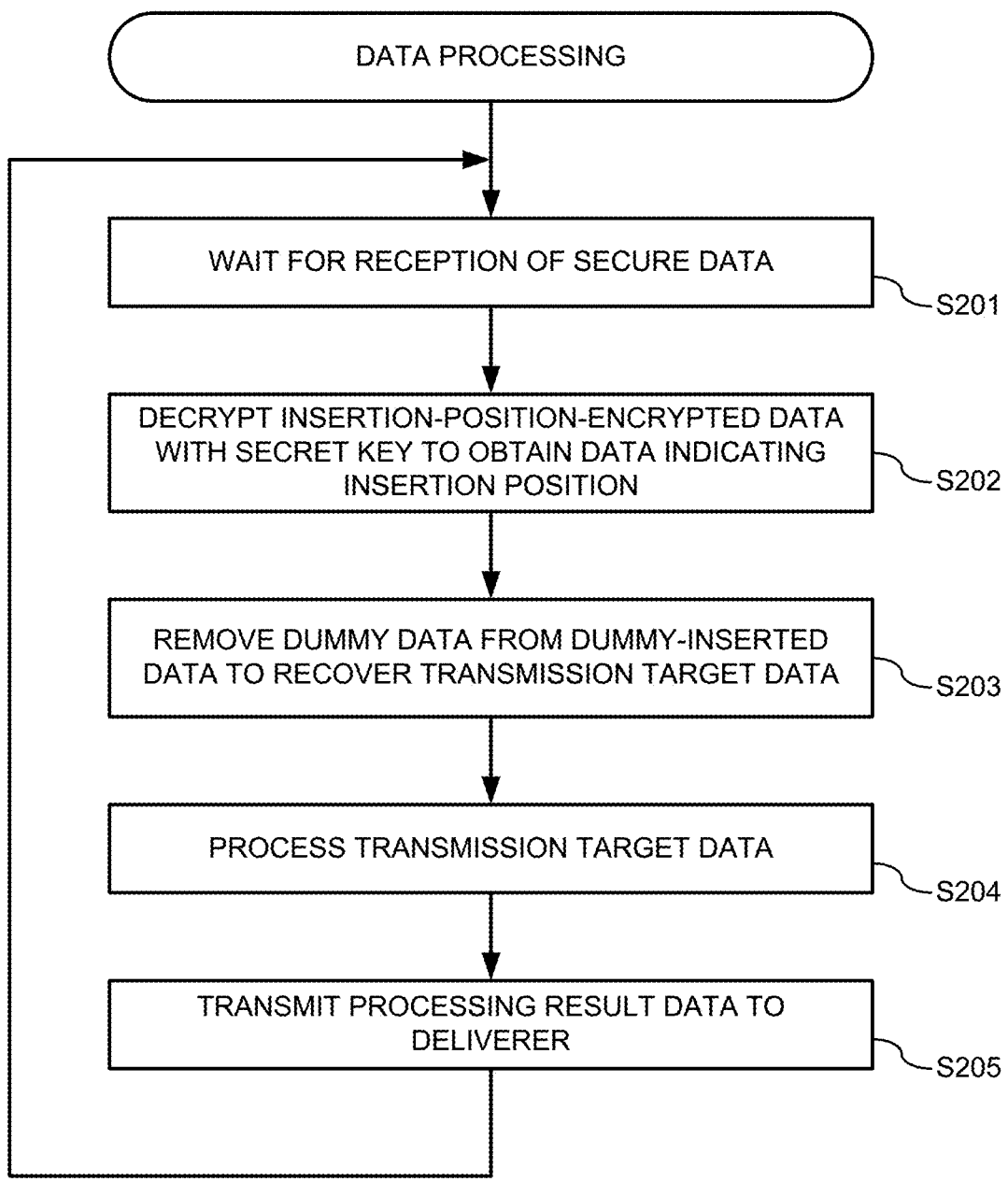
FIG. 11 is a flowchart illustrating an example of an operation of data processing by the data processor according to Embodiment 1 of the present disclosure.

Next, an example of an operation of data processing by the data processor 30 is described with reference to FIG. 11. The operation illustrated in FIG. 11 starts, for example, at the time of activation of the data management device 10.

The converter 310 of the data processor 30 waits for reception of the secure data to be transmitted by the deliverer 110 (step S201).

Upon reception of the secure data, the insertion position decryptor 311 of the converter 310 of the data processor 30 decrypts the insertion-position-encrypted data included in the secure data with the secret key SECa stored in the storage 320 to obtain data indicating the insertion position (step S202).

The data recoverer 312 of the converter 310 recovers the transmission target data, by referring to the data indicating the insertion position obtained in step S202, and removing the dummy data from the dummy-inserted data included in the secure data (step S203). The processing executor 330 of the converter 310 processes the transmission target data recovered in step S203 (step S204).

The processing executor 330 transmits to the deliverer 110 the processing result data obtained by processing the transmission target data (step S205). Then the data processor 30 repeats a flow of operation steps from step S201.

The data management system 1 according to Embodiment 1 is described above. According to the data management device 10 of the data management system 1, the data indicating the insertion position of the dummy data is encrypted with the public key PUBa of the data processor 30, and thus recovery of the transmission target data is difficult for the third party who does not have the secret key SECa corresponding to the public key PUBa.

Due to determination of the insertion position of dummy data every predetermined number of transmissions in the data management device 10, recovery of the transmission target data is difficult for the third party. In particular, changing the insertion position every transmission makes recovery of the transmission target data difficult for the third party.

In the data management device 10, determination of the insertion position such that the number of rows increases when dummy data is inserted into the time series data expressed in rows and columns and associated with time in each row makes recovery of the transmission target data difficult for the third party. Similarly, determination of the insertion position such that the number of columns increase makes recovery of the transmission target data difficult for the third party.

In the data management device 10, since encryption with the public key PUBa is not performed on the dummy-inserted data but only on the data indicating the insertion position, processing load is smaller than for a method for encrypting the whole data with the public key PUBa.

Embodiment 2

Figure 12:
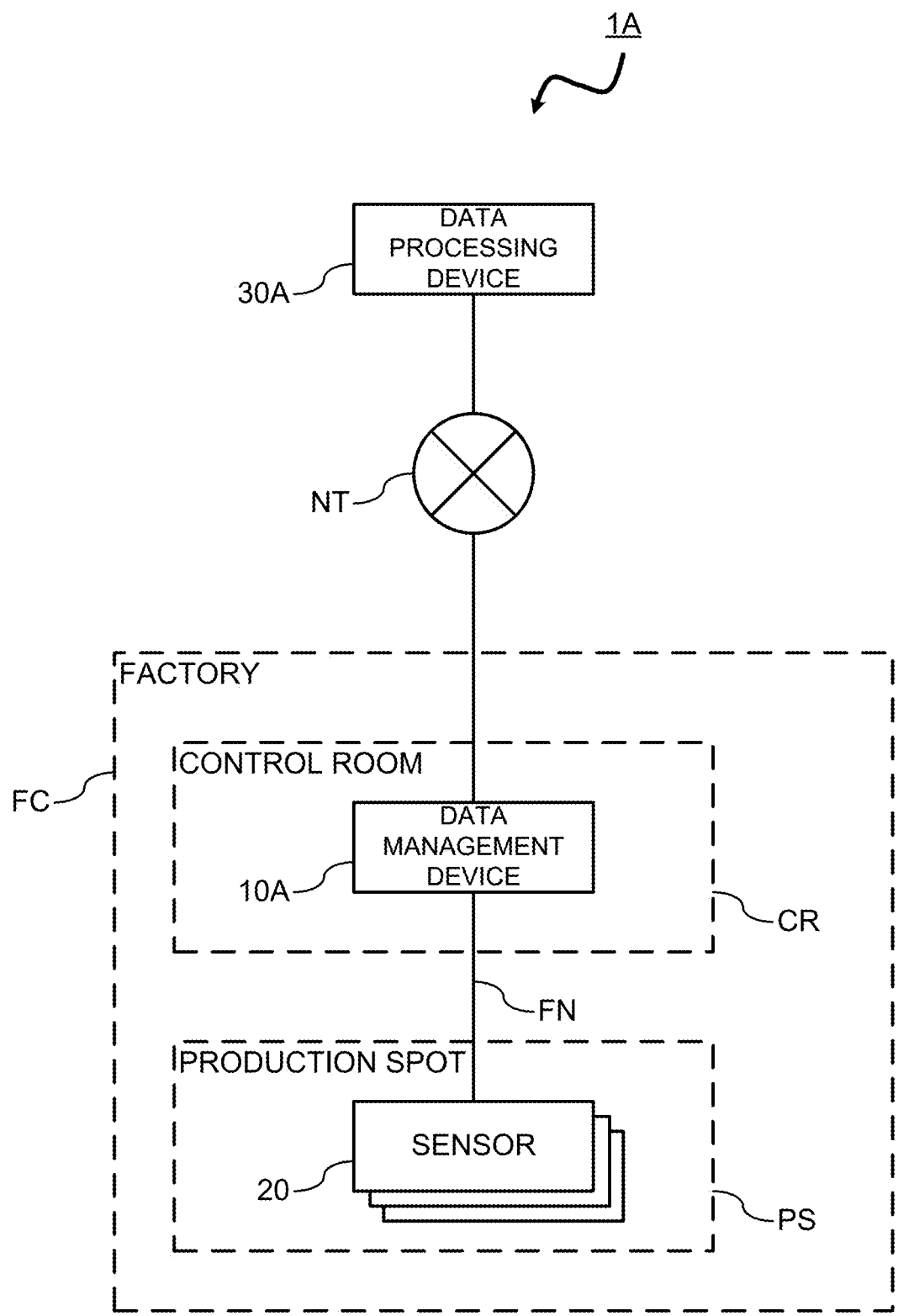
FIG. 12 is a configuration diagram of a data management system according to Embodiment 2 of the present disclosure.

A data management system 1A according to Embodiment 2 is described with reference to FIGS. 12, 13, and 14. The data management system 1A includes a data management device 10A, a sensor 20, and a data processing device 30A. The data management system 1A differs from that of Embodiment 1 in that the data management device 10A performs processing of data by transmitting secure data to a data processing device 30A through the Internet NT. In short, the data management system 1A is a data management system where the data processor 30 of the data management device 10 in Embodiment 1 is replaced with the data processing device 30A that is an external device. The data management system 1A is an example of the data management system according to the present disclosure.

In Embodiment 2, the public key PUBa is a public key of the data processing device 30A, and the secret key SECa is a secret key of the data processing device 30A corresponding to the public key PUBa.

Figure 13:
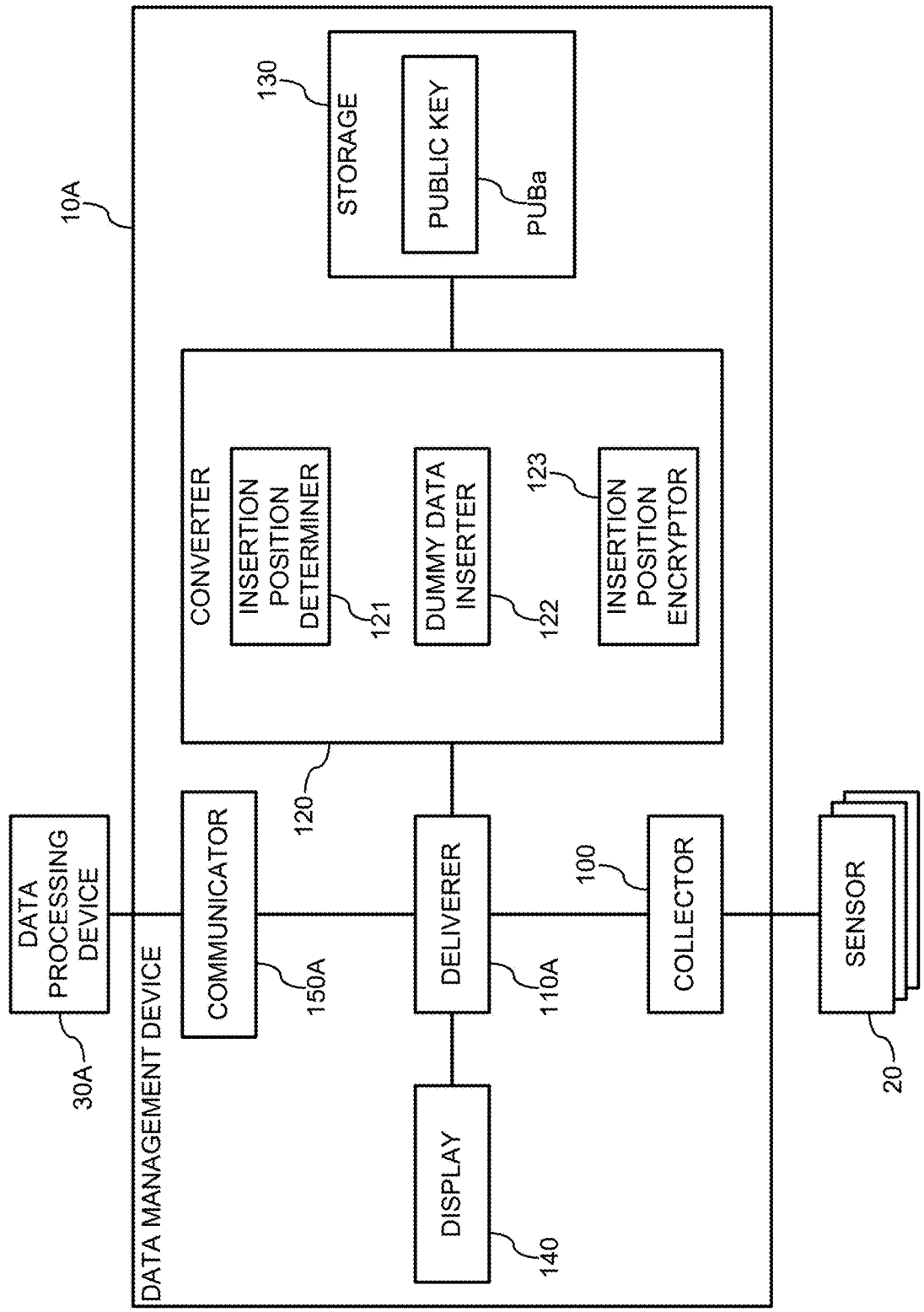
FIG. 13 is a functional configuration diagram of the data management device according to Embodiment 2 of the present disclosure.

As illustrated in FIG. 13, the data management device 10A differs from that of Embodiment 1 in that the data management device 10A further includes a communicator 150A that communicates with the data processing device 30A and the deliverer 110A communicates with the data processing device 30A through the communicator 150A.

Figure 14:
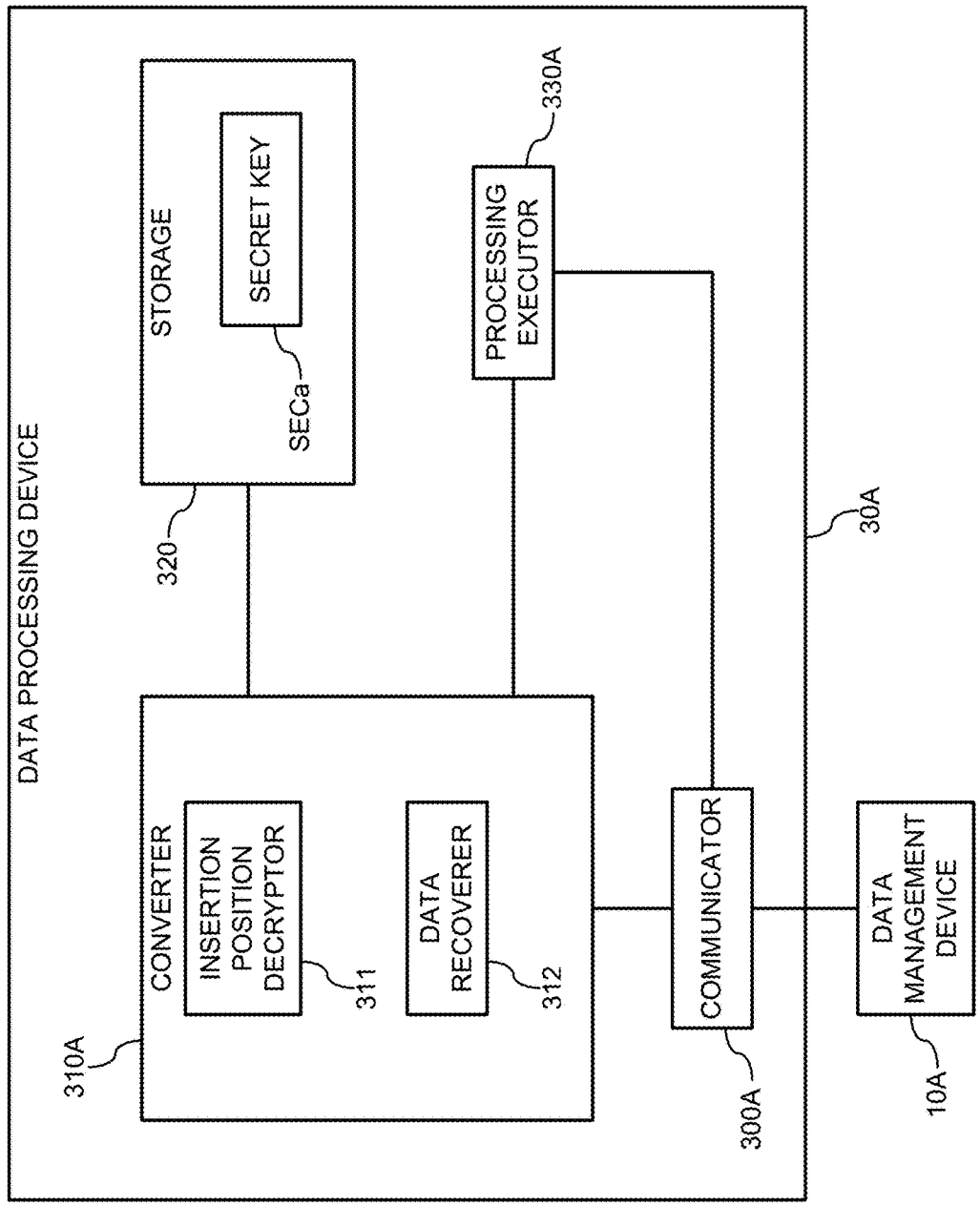
FIG. 14 is a functional configuration diagram of a data processing device according to Embodiment 2 of the present disclosure.

As illustrated in FIG. 14, although the data processing device 30A includes a configuration generally similar to the data processor 30 of Embodiment 1, the data processing device 30A differs from that of Embodiment 1 in that the data processing device 30A further includes a communicator 300A that communicates with the data management device 10A and the converter 310A and the processing executor 330A communicate with the data management device 10A through the communicator 300A. The data processing device 30A is an example of the data management device according to the present disclosure.

Similarly to the data management device 10, the data processing device 30A is implemented, for example, by using the hardware configuration illustrated in FIG. 5.

With the data management system 1A having the above configuration, the transmission target data to be transmitted by communication from the data management device 10A to the data processing device 30A that is communication between devices can be transmitted securely similarly to that of Embodiment 1. Description of operations and effects are omitted due to similarity to those of Embodiment 1.

Embodiment 3

Figure 15:
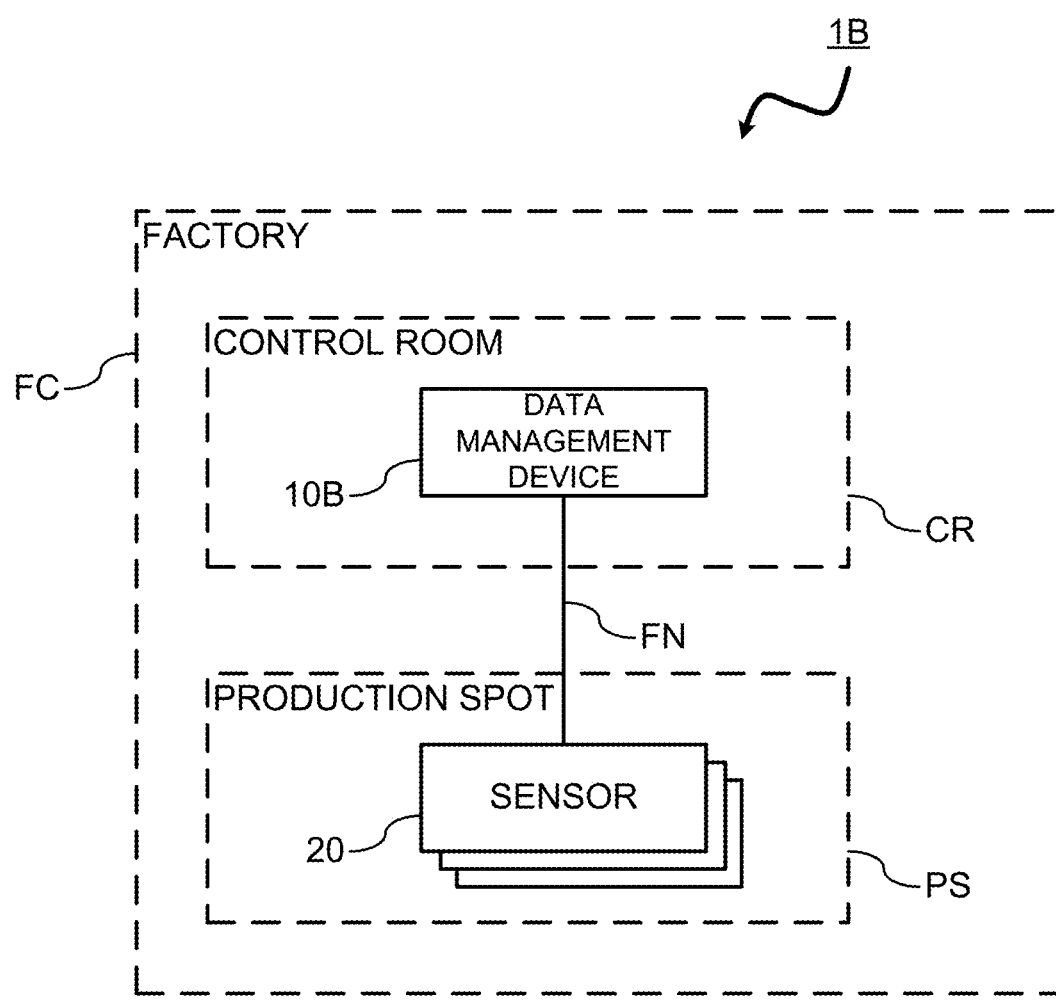
FIG. 15 is a configuration diagram of a data management system according to Embodiment 3 of the present disclosure.
Figure 16:
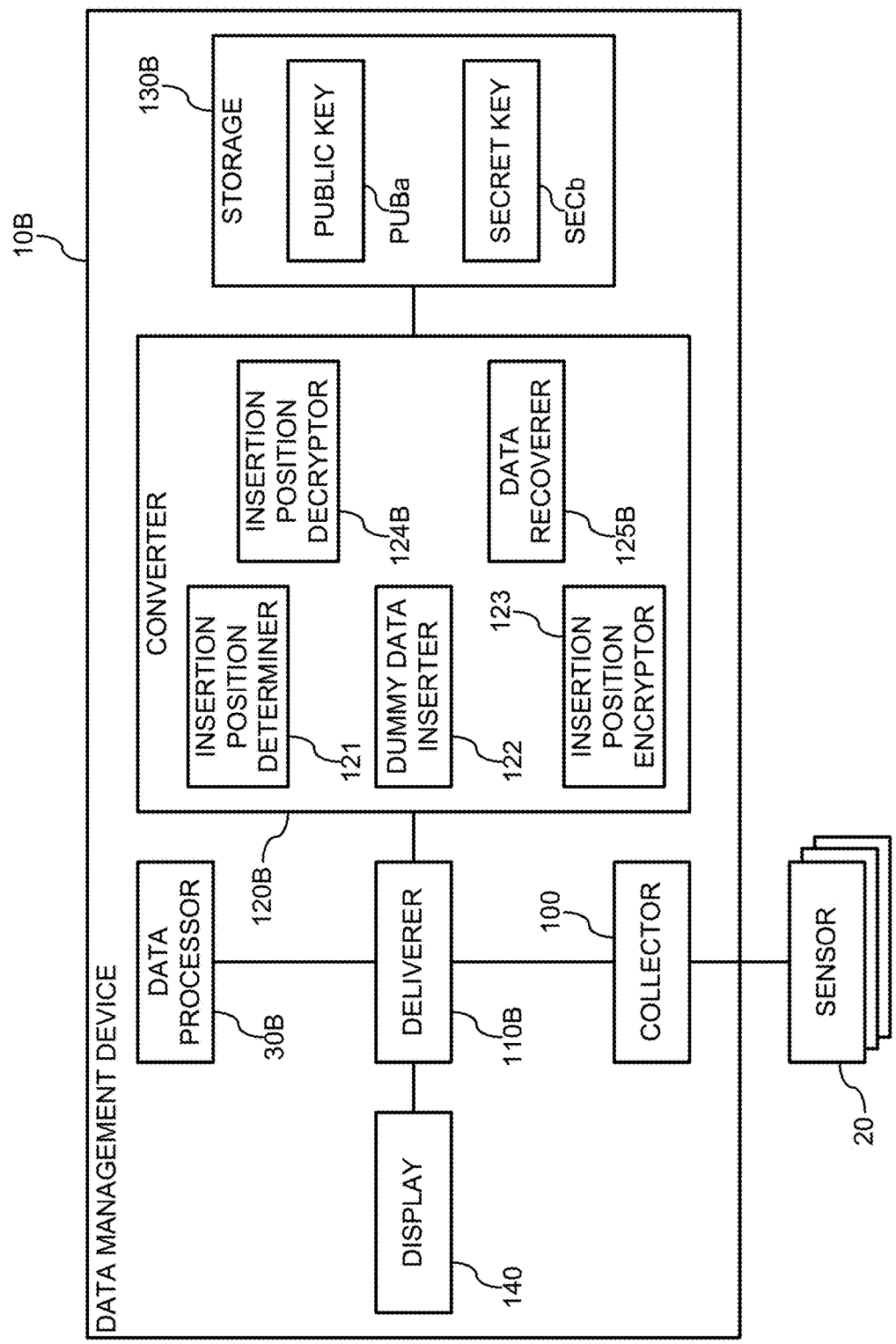
FIG. 16 is a functional configuration diagram of a data management device according to Embodiment 3 of the present disclosure.
Figure 17:
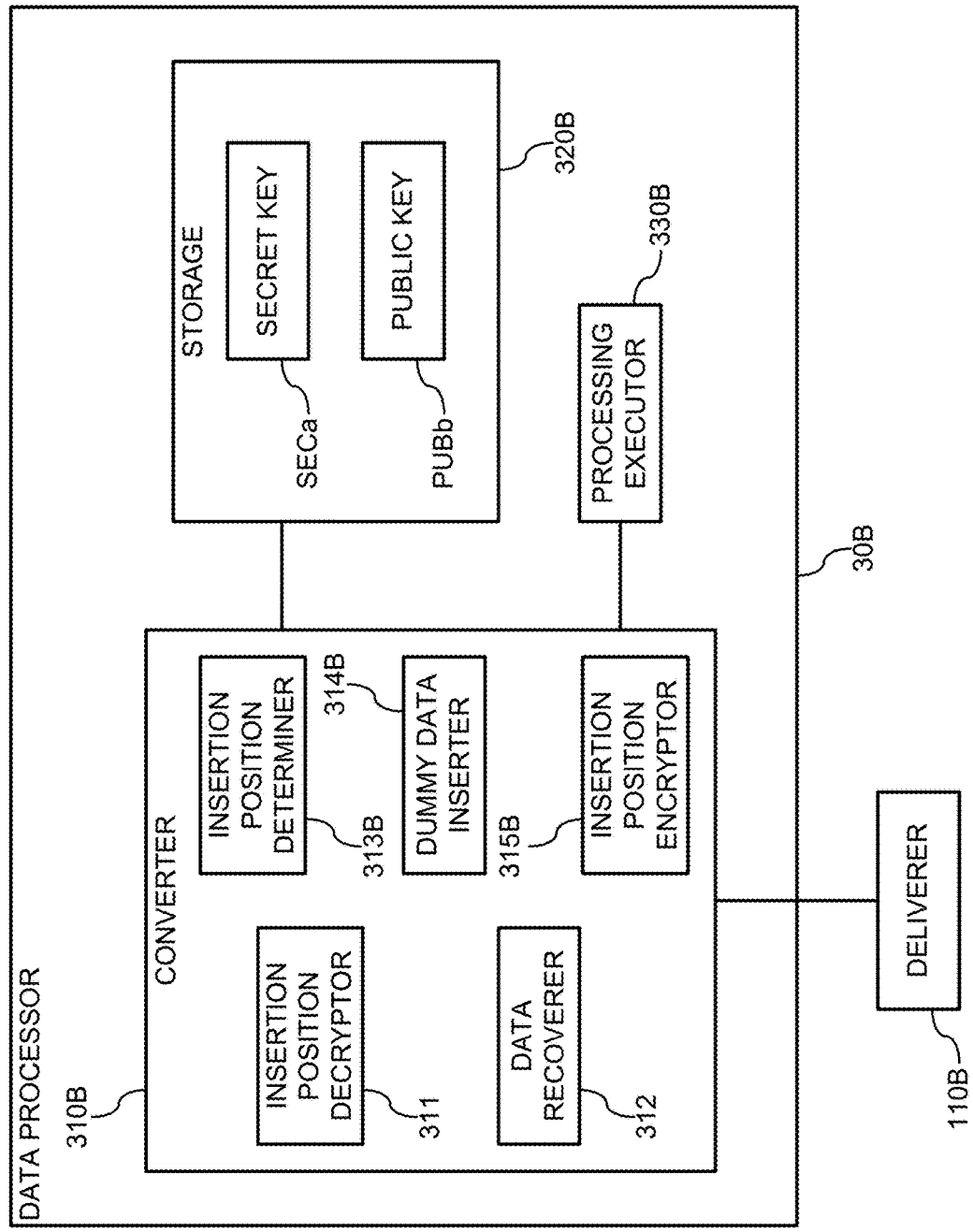
FIG. 17 is a functional configuration diagram of a data processor of the data management device according to Embodiment 3 of the present disclosure.

A data management system 1B according to Embodiment 3 is described with reference to FIGS. 15, 16, and 17. In the data management system 1B, processing result data to be transmitted from a data processor 30B to a deliverer 110B is also made secure. The securing methods are similar to those of Embodiment 1. The secure data is hereinafter referred to as secure result data. Configuration of the data management system 1B is similar to that of the data management system 1 of Embodiment 1 except that the data management device 10B has some differences relative to the data management device 10 of Embodiment 1.

Next, differences in functional components of the data management device 10B relative to those of Embodiment 1 are described with reference to FIG. 16. The data processor 30B is described later.

The deliverer 110B differs from that of Embodiment 1 in that the deliverer 110B receives the secure result data from the data processor 30B, converts the data into processing result data by a converter 120B, and outputs the data to the display 140. The converter 120B differs from that of Embodiment 1 in that the converter 120B has capabilities for converting the secure result data obtained from the deliverer 110B into the processing result data and outputting the data to the deliverer 110B. The storage 130B differs from that of Embodiment 1 in that the storage 130B further stores a secret key SECb of the data management device 10B.

The secret key SECb of the data management device 10B is a secret key created by a manufacturer of the data management device 10B and is associated with the data management device 10B. A public key PUBb described later of the data management device 10B is a public key corresponding to the secret key SECb. The public key PUBb is, for example, previously distributed to a creator of the data processor 30B by the manufacturer of the data management device 10B.

The converter 120B differs from that of Embodiment 1 in that the converter 120B further includes an insertion position decryptor 124B and a data recoverer 125B in order to convert the secure result data. The function of the insertion position decryptor 124B is similar to that of the insertion position decryptor 311 of the data processor 30 of Embodiment 1 except that decrypting is performed with the secret key SECb stored in the storage 130B. The function of the data recoverer 125B is similar to that of the data recoverer 312 of the data processor 30 of Embodiment 1.

Next, differences in functional components of the data processor 30B from those of Embodiment 1 are described with reference to FIG. 17.

The processing executor 330B differs from that of Embodiment 1 in that the processing executor 330B does not transmit the processing result data to the deliverer 110B but rather outputs the data to the converter 310B. The converter 310B differs from that of Embodiment 1 by having functions such that the converter 310B converts the processing result data obtained from the processing executor 330B into secure result data and outputs the data to the deliverer 110B. The storage 320B differs from that of Embodiment 1 in that the storage 320B further stores the public key PUBb of the data management device 10B.

The converter 310B differs from that of Embodiment 1 in that the converter 310B further includes an insertion position determiner 313B, a dummy data inserter 314B, and an insertion position encryptor 315B in order to convert the processing result data into the secure result data. The functions of the insertion position determiner 313B and the dummy data inserter 314B are generally similar to those of the insertion position determiner 121 and the dummy data inserter 122 of the data management device 10 of Embodiment 1. However, since the processing result data is not normally time series data, the insertion position may be determined by the aforementioned method (a). The function of the insertion position encryptor 315B is similar to that of the insertion position encryptor 123 of the data management device 10 of Embodiment 1 except that the insertion position encryptor 315B encrypts data indicating the insertion position with the public key PUBb stored in the storage 320B.

As seen from the viewpoint of transmission of the secure result data, the converter 310B is an example of transmission means according to the present disclosure, and the deliverer 110B is an example of reception means according to the present disclosure. From this point of view, the processing result data corresponds to the transmission target data.

With the data management device 10B having the above configuration, the processing result data to be transmitted from the data processor 30B to the deliverer 110B can also be transmitted securely similarly to the transmission target data. Description of operations and effects are omitted due to similarity to those of Embodiment 1.

MODIFIED EXAMPLE

In the above embodiments, encryption of data using an encryption key is not performed except for encryption of data indicating an insertion position with a public key. However, in addition to making data secure as described above, data may be encrypted with a common key.

For example, the converter 120 of the data management device 10 may encrypt the dummy-inserted data with the common key, and the converter 310 of the data processor 30 may decrypt the encrypted dummy-inserted data with the common key. The converter 120 and the converter 310 share the common key beforehand by some means. For example, at first-time communication between the deliverer 110 and the data processor 30, by the converter 120 generating a common key and encrypting the common key with the public key PUBa, by deliverer 110 sending the encrypted common key to the data processor 30, and by the converter 310 of the data processor 30 decrypting the encrypted common key into the secret key SECa, the common key is shared. In this case, the converter 120 is an example of common key encryption means according to the present disclosure.

Since encryption and decryption with the common key has smaller processing load than encryption with the public key and decryption with the secret key, the processing load would unlikely be an issue, for example, even if the whole dummy-inserted data is encrypted. Thus confidentiality of the transmission target data can be improved without increasing the processing load. In addition, since the transmission target data is made secure by insertion of dummy data and encryption of the insertion position, the transmission target data can be kept secure as long as the secret key SECa is not leaked even if the common key is leaked. On the contrary, even if the secret key SECa is leaked and the third party are able to know the insertion position of the dummy data, the third party cannot decrypt and to obtain the dummy-inserted data or recover the transmission target data as long as the common key is not leaked.

Although in the above embodiments, the data to be communicated between the deliverer 110 and the data processor 30 is made secure, sensed data to be transmitted to the data management device 10 from each sensor 20 may be made secure similarly. In this aspect, the sensor 20 is an example of the data management device according to the present disclosure.

Although in the above embodiments, the deliverer 110 combines the dummy-inserted data with the insertion-position-encrypted data and transmits the combined data, the dummy-inserted data and the insertion-position-encrypted data may be transmitted separately. For example, two communication paths to the deliverer 110 and to the data processor 30 are provided, and the dummy-inserted data may be transmitted through one communication path and the insertion-position-encrypted data may be transmitted through the other communication path. Use of the two communication paths improve confidentiality, for example, in a case where one of the communication paths is listened in on by the third party.

In Embodiment 1 described above, the data management device 10 creates the transmission target data based on the sensed data collected by the collector 100, converts the transmission target data into secure data by the converter 120, and transmits the secure data to the data processor 30. However, not only the sensed data collected by the collector 100 but also, for example, data stored in database or the like saved in the secondary storage 1004 may similarly be transmitted securely. For example, consider the case where the data to be executed by the data processor 30 is saved in the database, and the deliverer 110 refers to the database and transmits the data to the data processor 30. In this case, every time the data is accumulated in the database, it is necessary to read a newly accumulated data from the secondary storage 1004 and to be transmit to the data processor 30. In this case, the transmission target data is conceivably made secure by the converter 120 by treating the newly accumulated data as the transmission target data.

Embodiment 3 described above is contemplated as modifying Embodiment 1 and transmitting the secure result data from the data processor 30B to the deliverer 110B. Similarly, Embodiment 2 can be modified into an embodiment where the secure result data is transmitted from the data processing device 30A to the data management device 10A.

In the hardware configuration illustrated in FIG. 5, the data management device 10 includes the secondary storage 1004. However, the configuration is not limited thereto. The secondary storage 1004 may be provided externally relative to the data management device 10 and may be connected to the data management device 10 and the secondary storage 1004 via the interface 1003. In this embodiment, a removable media such as a USB flash drive, a memory card or the like is usable as the secondary storage 1004.

In place of the hardware configuration illustrated in FIG. 5, the data management device 10 may be configured by a dedicated circuit such as an application specific integrated circuit (ASIC), a field programmable gate array (FPGA), or the like. In the hardware configuration illustrated in FIG. 5, a part of the functions of the data management device 10 may be implemented by using the dedicated circuit connected to the interface 1003.

A program for use in the data management device 10 can be stored in a computer-readable recording medium, such as a compact disc read only memory (CD-ROM), a digital versatile disc (DVD), a USB flash drive, a memory card, an HDD, or the like, and can be distributed. By installation of such program in a specific-purpose or general-purpose computer, the computer can function as the data management device 10.

The aforementioned program may be stored beforehand in a storage included in another server on the Internet so as to be downloaded from the server.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitable for data communication.

REFERENCE SIGNS LIST 1, 1A, 1B Data management system
10, 10A, 10B Data management device
20 Sensor
30, 30B Data processor
30A Data processing device
100 Collector
110, 110A, 110B Deliverer
120, 120B Converter
121 Insertion position determiner
122 Dummy data inserter
123 Insertion position encryptor
124B Insertion position decryptor
125B Data recoverer
130, 130B Storage
140 Display
150A Communicator
300A Communicator
310, 310A, 310B Converter
311 Insertion position decryptor
312 Data recoverer
313B Insertion position determiner
314B Dummy data inserter
315B Insertion position encryptor
320, 320B Storage
330, 330A, 330B Processing executor
1000 Bus
1001 Processor
1002 Memory
1003 Interface
1004 Secondary storage
CR Control room
FC Factory
FN Factory network
NT Internet
PS Production spot
PUBa, PUBb Public key
SECa, SECb Secret key

The invention claimed is:

1. A data management device comprising:
a transmission target data creator to create transmission target data expressed in rows and columns, based on sensed data that is continuously collected from a sensor and associated with a collection time of a day;
an insertion position determiner to determine an insertion position of dummy data to be inserted into the transmission target data to prevent guessing of the dummy data based on a difference of column data;
a dummy data inserter to insert the dummy data in the insertion position of the transmission target data to create dummy-inserted data;
an insertion position encryptor to encrypt data indicating the insertion position of the dummy data with a public key to create insertion-position-encrypted data; and
a transmitter to transmit the dummy-inserted data and the insertion-position-encrypted data, wherein
the transmission target data include time series data associated with the collection time in each row, and
the insertion position determiner determines the insertion position for the dummy data so that a number of the rows of the time series data increases.

2. The data management device according to claim 1, wherein the insertion position determiner determines the insertion position for the dummy data every predetermined number of transmissions.

3. The data management device according to claim 1, wherein
the transmission target data include the time series data expressed in rows and columns and associated with the collection time in each row, and
the insertion position determiner further determines the insertion position for the dummy data so that a number of the columns of the time series data increases.

4. The data management device according to claim 1, further comprising:
a common key encryptor to encrypt the dummy-inserted data with a common key, wherein
the transmitter transmits the dummy-inserted data encrypted with the common key encryptor and the insertion-position-encrypted data.

5. The data management device according to claim 1, further comprising:
a receiver to receive the dummy-inserted data and the insertion-position-encrypted data from the transmitter;
an insertion position decryptor to decrypt the insertion-position-encrypted data with a secret key corresponding to the public key to obtain data indicating the insertion position of the dummy data; and
a data recoverer to remove from the dummy-inserted data the dummy data inserted in the insertion position to recover the transmission target data.

6. The data management device according to claim 1, wherein the transmitter transmits the dummy-inserted data and the insertion-position-encrypted data to a data processor having a secret key corresponding to the public key.

7. The data management device according to claim 1, wherein the dummy data inserter inserts the dummy data such that one or more entire rows include only the dummy data in increasing the number of the rows in the time series data.

8. The data management device according to claim 7, wherein the dummy data inserter inserts the dummy data such that one or more entire columns include only the dummy data.

9. A data management system comprising:
a first data management device; and
a second data management device,
the first data management device including:
- a transmission target data creator to create transmission target data expressed in rows and columns, based on sensed data that is continuously collected from a sensor and associated with a collection time of a day,
- an insertion position determiner to determine an insertion position of dummy data to be inserted into the transmission target data to prevent guessing of the dummy data based on a difference of column data,
- a dummy data inserter to insert the dummy data in the insertion position of the transmission target data to create dummy-inserted data,
- an insertion position encryptor to encrypt data indicating the insertion position of the dummy data with a public key to create insertion-position-encrypted data, and
- a transmitter to transmit the dummy-inserted data and the insertion-position-encrypted data to the second data management device, wherein
the transmission target data include time series data associated with the collection time in each row, and
the insertion position determiner determines the insertion position for the dummy data so that a number of the rows of the time series data increases, and the second data management device including:
- a receiver to receive the dummy-inserted data and the insertion-position-encrypted data transmitted with the first data management device,
- an insertion position decryptor to decrypt the insertion-position-encrypted data with a secret key corresponding to the public key to obtain data indicating the insertion position of the dummy data; and
- a data recoverer to remove from the dummy-inserted data the dummy data inserted in the insertion position of the dummy data to recover the transmission target data.

10. A non-transitory computer-readable recording medium storing a program, the program causing a computer to function as:
- a transmission target data creator to create transmission target data expressed in rows and columns, based on sensed data that is continuously collected from a sensor and associated with a collection time of a day;
- an insertion position determiner to determine an insertion position of dummy data to be inserted into the transmission target data;
- a dummy data inserter to insert the dummy data in the insertion position of the transmission target data to create dummy-inserted data;
- an insertion position encryptor to encrypt data indicating the insertion position of the dummy data with a public key to create insertion-position-encrypted data; and
- a transmitter to transmit the dummy-inserted data and the insertion-position-encrypted data, wherein
the transmission target data include time series data associated with the collection time in each row, and
the insertion position determiner determines the insertion position for the dummy data so that a number of the rows of the time series data increases.

\* \* \* \* \*